(12) United States Patent
Forsell

(10) Patent No.: US 7,856,246 B2
(45) Date of Patent: Dec. 21, 2010

(54) MULTI-CELL DATA PROCESSOR

(75) Inventor: Martti Forsell, Jääli (FI)

(73) Assignee: Nokia Corporation, Espoo (FI)

( * ) Notice: Subject to any disclaimer, the term of this patent is extended or adjusted under 35 U.S.C. 154(b) by 900 days.

(21) Appl. No.: 11/726,328

(22) Filed: Mar. 21, 2007

(65) Prior Publication Data

US 2008/0232445 A1    Sep. 25, 2008

(51) Int. Cl.
*H04M 1/00* (2006.01)
*H04B 1/16* (2006.01)

(52) U.S. Cl. .................... 455/552.1; 455/338

(58) Field of Classification Search .......... 455/550.1, 455/552.1, 553.1, 556.1, 557, 280, 293, 338; 712/10, 11, 32, 33
See application file for complete search history.

(56) References Cited

U.S. PATENT DOCUMENTS

| | | | |
|---|---|---|---|
| 6,366,997 B1 | 4/2002 | Barry et al. | 712/11 |
| 2005/0283587 A1 | 12/2005 | Pappalardo et al. | 712/22 |
| 2007/0191007 A1* | 8/2007 | Hayek et al. | 455/435.2 |

FOREIGN PATENT DOCUMENTS

| WO | WO-2006/017339 A2 | 2/2006 |
|---|---|---|
| WO | WO-2006/017339 A3 | 2/2006 |

OTHER PUBLICATIONS

Gay-Bellile, O. et al., "A Reconfigureable Superimposed 2D-Mesh Array For Channel Equalization", Proceedings Of The 2002 IEEE International Symposium On Circuits And Systems, US, vol. 1, May 26, 2002, pp. 893-896, XP-002273540.

Burns, G. et al., "Array Processing For Channel Equalization", 2002 IEEE International Conference On Acoustics, Speech, And Signal Processing, US, vol. 3, May 13, 2002, XP-010804026, pp. 3200-3203.

Baas, Bevan et al., "AsAP: A Fine-Grained Many-Core Platform For DSP Applications", IEEE Micro, vol. 27, No. 2, Mar. 1, 2007, pp. 34-45, XP-011190027, ISSN: 0272-1732.

Meeuwsen et al., "A Full-Rate Software Implementation Of An IEEE 802.11A Compliant Digital Baseband Transmitter", Signal Processing Systems, 2004, IEEE, Oct. 13, 2004, pp. 124-129, XP-010743947.

(Continued)

*Primary Examiner*—Nguyen Vo
(74) *Attorney, Agent, or Firm*—Harrington & Smith

(57) ABSTRACT

The exemplary embodiments of this invention provide a data processor having a processor engine composed of a plurality of processor cells, each cell including a local instruction memory and an instruction sequencer and being configured for selective connection with at least one adjacent cell enabling communication between cells. The processor engine is configured to be interposed between a radio frequency section and a baseband section to process data output from the baseband section prior to inputting the processed data to the radio frequency section, and to process signals output from the radio frequency section prior to inputting processed data to the baseband section. A plurality of communication-related functions are mapped into a corresponding plurality of regions of cells, and local instruction memory is configured to store program instructions for implementing all or a part of the associated function. As examples, one function may be a CORDIC function and another function may be a FIR filter function.

42 Claims, 13 Drawing Sheets

OTHER PUBLICATIONS

Yu, Zhiyi et al., "Performance and Power Analysis of Globally Asynchronous Locally Synchronous Multi-Processor Systems", Emerging VLSI Technologies and Architectures, 2006, IEEE Computer Society Annual Symposium On Klarlsruhe, Germany, Mar. 2-3, 2006, XP-010898670, pp. 378-383.

Agarwal, A. et al., "The Raw Microprocessor: A Computational Fabric For Software Circuits And General-Purpose Programs", IEEE Micro, US, vol. 22, No. 2, Mar. 1, 2002, pp. 25-35, XP-011094422.

Schmidt, Ulrich, "Datawave: A Single-Chip Multiprocessor for Video Applications", IEEE Micro, vol. 11, No. 3, Jun. 1, 1991, Los Alamitos, CA, US, pp. 22-22, 88, XP-000237234.

Weinhardt et al., "Using Function Folding to Improve Silicon Efficiency of Reconfigurable Arithmetic Arrays", IEEE, Dec. 6, 2004, pp. 239-246, XP-010767554.

Koren, Israel et al., "A Data-Driven VLSI Array for Arbitrary Algorithms", Computer, IEEE, vol. 21, No. 10, Oct. 1, 1988, pp. 30-43, XP-000118929.

Yeung, Alfred K.W. et al., "A Reconfigurable Data-driven Multiprocessor Architecture for Rapid Prototyping of High Throughput DSP Algorithms", System Sciences, vol. I, Jan. 5, 1993, pp. 169-178, XP-010640447.

Forsell, Martti, "Networks on Chip—Chapter 9—A Parallel Computer As A NOC Region", 2003, Kluwer Academic Publishers, Boston, USA, pp. 173-193, XP-002487290, ISBN: 1-4020-7392-5.

Arndt, Marylin et al., "Software Radio: The Challenges For Reconfigurable Terminals", Annales Des Telecommunications, Paris, France, vol. 57, No. 7/08, Jul. 1, 2002, pp. 570-612, XP-001124779, ISSN: 0003-4347.

Athanas, Peter et al., "An Overview of Configurable Computing Machines for Software Radio Handsets", IEEE Communications Magazine, vol. 4, No. 7, Jul. 1, 2003, pp. 134-141, XP-011098964, ISSN: 0163-6804.

Upadhyay, Adhir et al., "Optimal Partitioning of Globally Asynchcronous Locally Synchronous Processor Arrays", Proceedings of the 2004 ACM Great Lakes Symposium on VLSI, GLSVLSI 2004, pp. 7-12, XP-002487289.

"A Survey of CORDIC algorithms for FPGA based computers", Ray Andraka et al., ACM 0-89791-978, 1998, 10 pgs.

"A Systolic Array Processor for Software Defined Radio", Lattice ECP/EC FPGA, Apr. 2005, pp. 1-17.

"Overview of recent supercomputer", Aad J. van der Steen, ISBN 90-72910-03-6, 2004, 68 pgs.

* cited by examiner

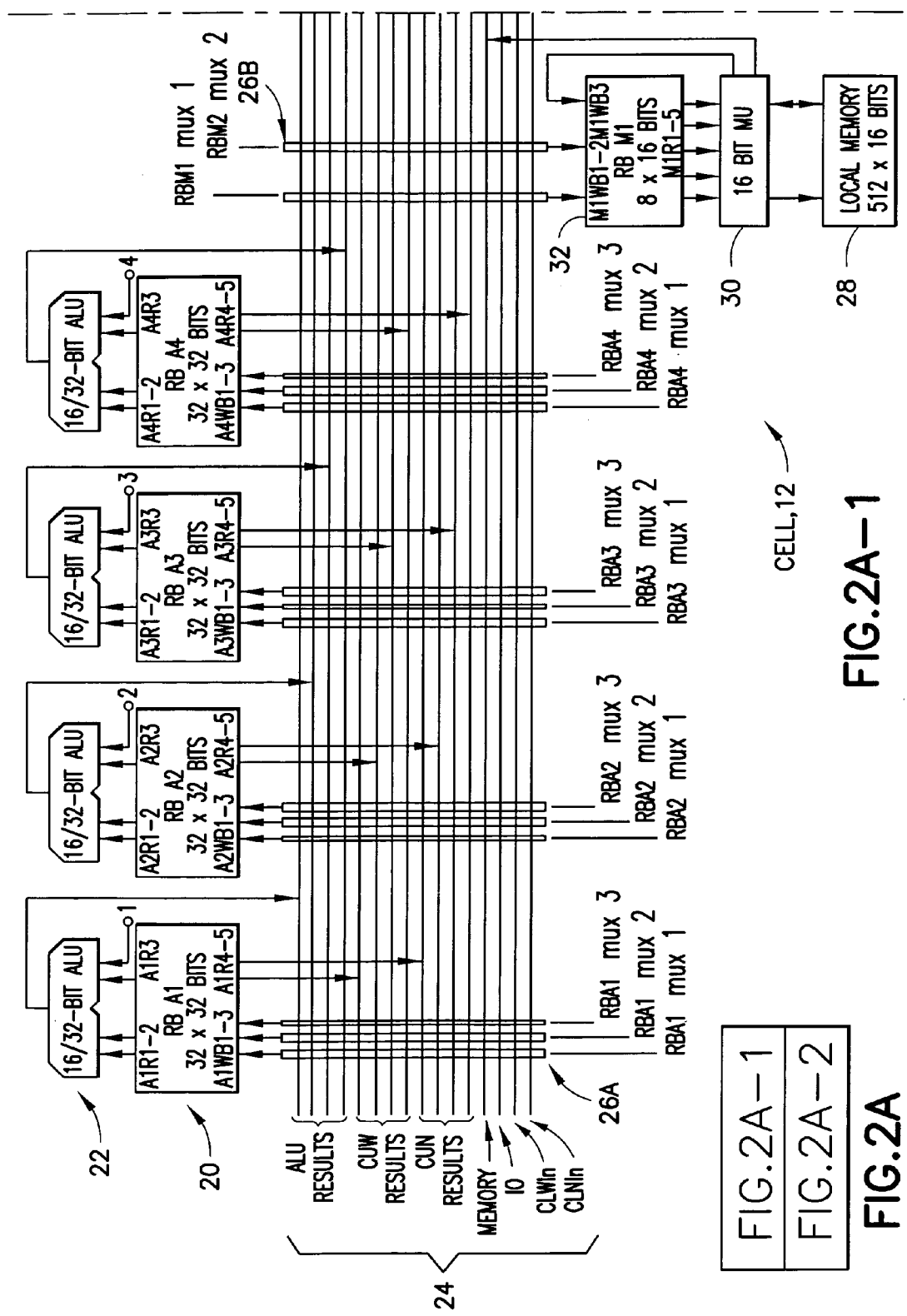

| BLOCK | # BLOCKS | TYPE |
|---|---|---|
| ALU | A | RALU 32-BIT REGISTERS (INTERPRETED AS 32 16+16-BIT REGISTERS FOR SOME OPERATIONS)<br>– 5 READ PORTS    ALU Ra, ALU Rb, ALU Rc, CLn, CLw    {AxR1-5}<br>– 3 WRITE PORTS  DATA 1, DATA 2/CLw, CLn                      {AxWB1-3} |
| MU | M | Rmu 16-BIT REGISTERS<br>– 5 READ PORTS    MU Ra, MU Rb, MU Rc, MU Rd, MU Re    {MxR1-5}<br>– 3 WRITE PORTS  DATA 1, DATA 2, OFFSET                          {MxWB1-2} |
| I/O | 1 | Riu 16-BIT REGISTERS<br>– 5 READ PORTS    IU Ra, IU Rb                                    {IxR1-5}<br>– 3 WRITE PORTS  DATA, ADDRESS/OFFSET/INDEX           {IxWB1-3} |
| SEQ | 1 | Rseq 16-BIT REGISTERS<br>– 2 READ PORTS    SEQ Ra, SEQ PC                              {SR1-2}<br>– 2 WRITE PORTS  DATA, PC                                           {SWB1-2} |

FIG.4

FULLY CONNECTED TORUS

LIMITED CONNECTIVITY ALTERNATIVE 1
—DEGREE OF CELLS IS LIMITED TO 3

FULL MESH OF CELLS
—DEGREE OF CELLS IN 4

COATED I/O SYSTEM ALTERNATIVE

DEDICATED I/O PORTS ALTERNATIVE
—EACH CELL HAS A SET OF DEDICATED I/O LINKS

MULTI-CELL DATA PROCESSOR

TECHNICAL FIELD

The exemplary and non-limiting embodiments of this invention relate generally to data processors, such as those suitable for use in user equipment of a wireless communication system.

BACKGROUND

Various abbreviations that appear in the specification and/or in the drawing figures are defined as follows:
ASIC application specific integrated circuit
DSP digital signal processor
MIMD multiple instruction stream multiple data stream
RF radio frequency
VLIW very long instruction word
FIR finite impulse response
CORDIC coordinate rotation digital calculation
I/O input/output
IU I/O unit
ALU arithmetic/logical unit
RB register block
CU communication unit
MU memory unit
EDGE enhanced data rates for global evolution
GSM global system for mobile communications
WCDMA wideband code division multiple access
UTRAN universal terrestrial radio access network
EUTRAN evolved UTRAN
UE user equipment
MIMO multiple input, multiple output The computational requirements of a digital RF front end of some current and future multi-standard (multi-mode) mobile terminals are in the range of tens of billions of operations per second (GOPS) due at least in part to the number of functions that should be executed in parallel. A significant number of the data processing requirements arise from different FIR filter and CORDIC computations having different numbers of taps, different relative sampling frequencies, and different decimation settings. At present, there are no processor-based solutions available that would meet the extremely limited silicon area, and power consumption requirements, of an integrated circuit data processor platform. Further, and in general, existing approaches that utilize ASIC-based technology are not able to provide the flexibility, programmability and the fast time-to-market that is desired.

For example, the FIR is a commonly used type of digital filter, including adaptive digital filters, where digitized samples of a signal serve as inputs, and each filtered output is computed from a weighted sum of a finite number of previous inputs. A FIR filter can be designed to have linear phase (i.e., constant time delay, regardless of frequency).

Further by example, various types of CORDIC algorithms are described in an article "A survey of CORDIC algorithms for FPGA based computers", R. Andraka, Copyright 1998 ACM 0-89791-978-5/98/01.

The problem has been traditionally approached through the use of dedicated ASIC blocks that implement the required functions (e.g., by providing dedicated FIR and/or CORDIC circuit blocks in the ASIC). However, the use of dedicated ASIC blocks does not provide flexibility, programmability or, typically, a fast time-to-market. While conventional DSP-based solutions might in theory address the foregoing problems, they generally require an excessive amount of silicon area and operating power.

SUMMARY OF THE EXEMPLARY EMBODIMENTS

The foregoing and other problems are overcome, and other advantages are realized, in accordance with the non-limiting and exemplary embodiments of this invention.

In a first aspect thereof the exemplary embodiments of this invention provide a data processor having a processor engine comprised of a plurality of processor cells, each cell comprising a local instruction memory and an instruction sequencer and being configured for selective connection with at least one adjacent cell enabling communication between cells. The processor engine is configured to be interposed between a radio frequency section and a baseband section to process data output from the baseband section prior to inputting the processed data to the radio frequency section, and to process signals output from the radio frequency section prior to inputting processed data to the baseband section.

In a second aspect thereof the exemplary embodiments of this invention provide a method that includes: providing a processor engine comprised of a plurality of processor cells, each cell comprising a local instruction memory and an instruction sequencer and being configured for selective connection with at least one adjacent cell enabling communication between cells, said processor engine configured to be interposed between a radio frequency section and a baseband section to process data output from the baseband section prior to inputting the processed data to the radio frequency section, and to process signals output from the radio frequency section prior to inputting processed data to the baseband section; mapping a plurality of functions into a corresponding plurality of regions of cells, each region comprising at least one cell; and configuring the local instruction memory of each cell of a region to store program instructions for implementing all or a part of the associated function.

In a further aspect thereof the exemplary embodiments of this invention provide a device that comprises a radio frequency section, a baseband section and, interposed between the radio frequency section and the baseband section, a processor engine comprised of a plurality of processor cells. Each cell comprises a local instruction memory and an instruction sequencer and is configured for selective connection with at least one adjacent cell enabling communication between cells. The processor engine is configured to process data output from the baseband section prior to inputting the processed data to the radio frequency section, and to process signals output from the radio frequency section prior to inputting processed data to the baseband section.

In another aspect thereof the exemplary embodiments of this invention provide a communication device that comprises means for transmitting and receiving radio frequency signals; means for processing baseband data; and a processor engine interposed between the means for transmitting and receiving and the means for processing baseband data. The processor engine is comprised of a plurality of processor cells, where each cell comprises instruction storage and execution means, and further comprises means for selectively connecting to at least one adjacent cell for enabling communication between cells. In the communication device a plurality of communication-related functions are mapped into a corresponding plurality of regions of cells, where each region comprises at least one cell, and where the instruction storage and execution means of each cell of a region is configured to store program instructions for implementing all or a part of the associated function.

BRIEF DESCRIPTION OF THE DRAWINGS

The foregoing and other aspects of the teachings of this invention are made more evident in the following Detailed Description, when read in conjunction with the attached Drawing Figures, wherein:

FIG. 4 is a table that is useful in describing aspects of the cell architectures shown in FIG. 2.

DETAILED DESCRIPTION

The exemplary embodiments of this invention relate in part to a high level architecture for a tightly-coupled RF signal processing VLIW MIMD hybrid data processor. The exemplary embodiments of this invention relate further to the architecture of an application-specific data processors suitable for use in RF signal processing and optimized for executing, as non-limiting examples, FIR filter and CORDIC computations.

Figure 1:
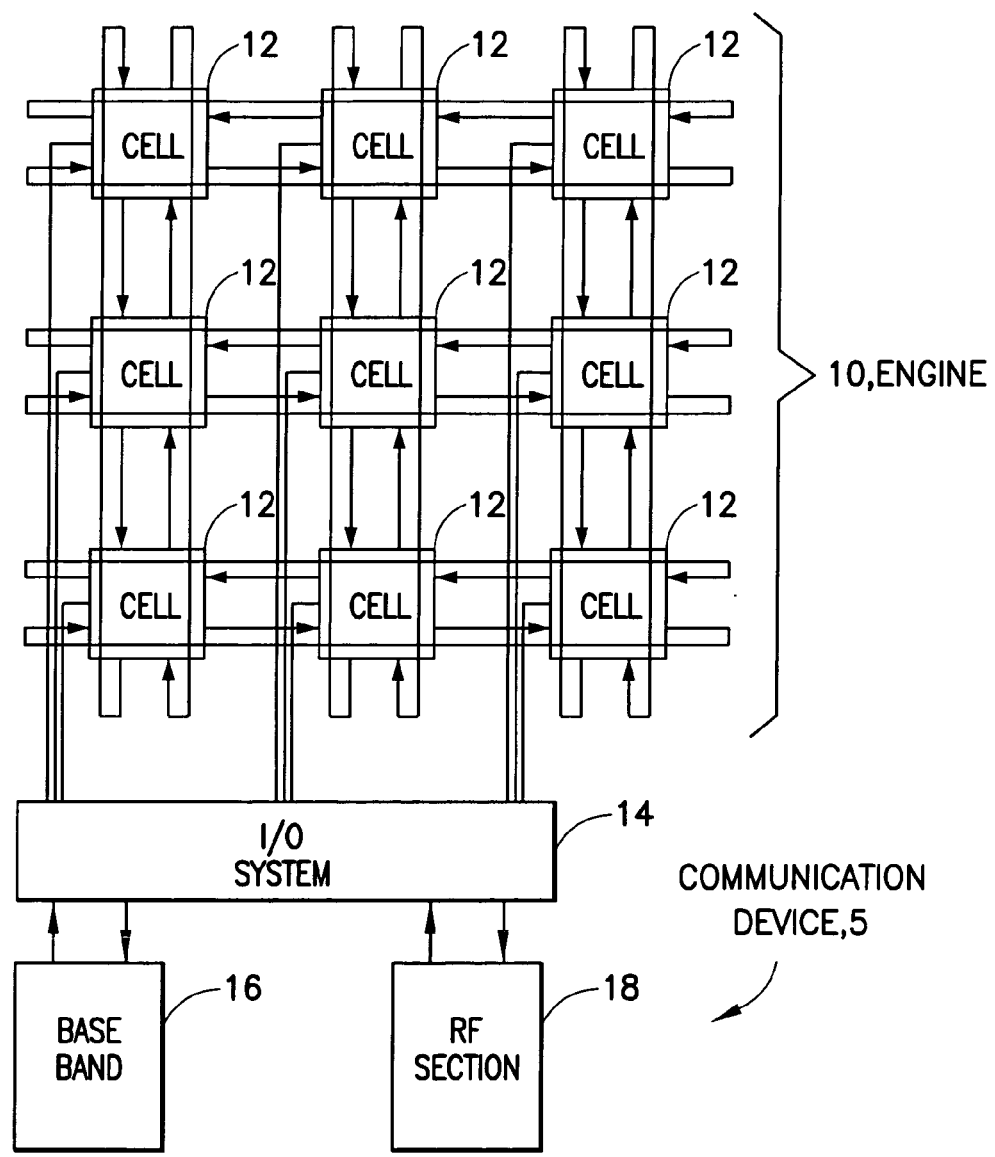
FIG. 1 is a simplified block diagram of a communication device that includes a multi-cell processor engine that is interposed between a RF section and a baseband section, and that is coupled through an I/O section, in accordance with exemplary embodiments of this invention.

By way of introduction, and referring to FIG. 1, the exemplary embodiments of this invention provide a parametric homogeneous VLIW MIMD hybrid multiprocessor, referred to hereafter as a processing engine or more simply as an engine 10, that is optimized for RF signal processing. The engine 10 includes P identical cells (or processor cores) 12 that are interfaced to an I/O system 14 and interconnect able via a communication network into a plurality of different topologies, including a torus topology. The I/O system 14 provides an interface for the engine 10, in one non-limiting use case that is of particular interest, to an RF section 18 and a baseband section 16 (baseband processor section). The RF section 18 generally includes analog circuits for transmitting and receiving radio frequency signals, while the baseband section 16 generally includes digital circuits for performing operations such as, but not limited to, encoding information to be transmitted, decoding information that is received, error correction and channel estimation. The engine 10 provides enhanced performance scalability and programmability with respect to application specific heterogeneous parallel architectures, a high utilization of functional units, and a potential to achieve low power consumption.

Figure 9:
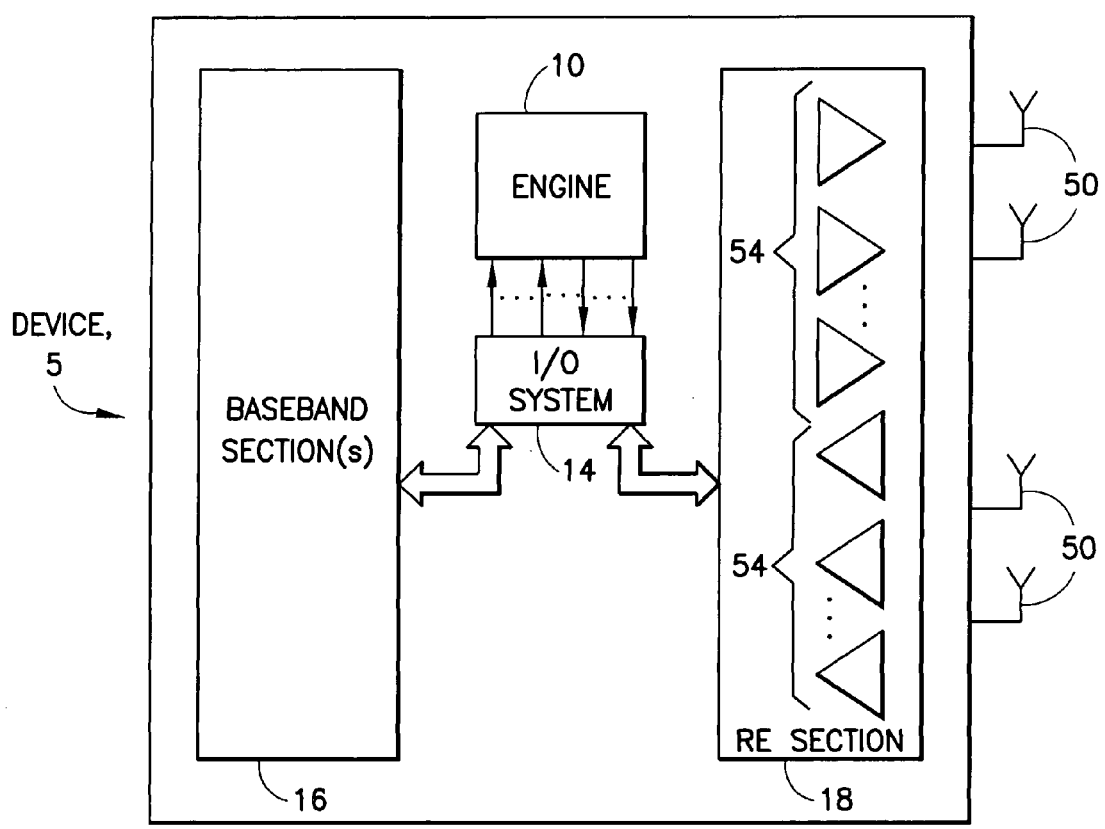
FIG. 9 illustrates a device that incorporates a multi-cell processor in accordance with the exemplary embodiments of this invention.

The structure shown in FIG. 1 may be viewed as representing a communication device 5, such as a UE that can include, but is not limited to, a cellular phone. Reference may also be had to FIG. 9 which illustrates a non-limiting embodiment of a device 5 that is constructed and operated in accordance with the exemplary embodiments of this invention. In FIG. 9 the device 5 may include one or more transmit and/or receive antennas 50, the RF section 18 that includes one or more transmitters and/or receivers 52, 54, at least one baseband section 16 and, interposed between the RF section 18 and the baseband section 16, the I/O system 14 providing bi-directional signal flow with the multi-cell processor engine 10. As will be described in further detail below, the device 5 may be a multi-mode device, and may also be capable of operating in a plurality of frequency bands (a multi-band device).

VLIW operation over a group or cluster of cells 12, also referred to as a region, is achieved by providing an identical control code for each cell of the group and starting operations of the cells of the group synchronously. Note that a unique control in a region may be employed so long as it does not break synchronization between the cells belonging to the region (e.g., see the discussion of FIG. 3B below).

Each cell 12 is inter-connected only with its nearest neighbor (adjacent) cells. This provides a constant communication delay between all of the cells 12, and thus can be considered as a known variable.

Figure 5C:
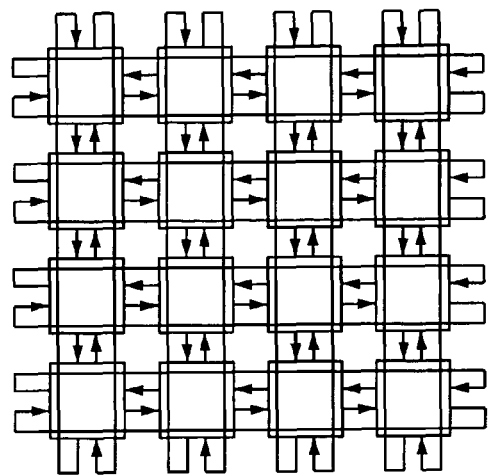
FIGS. 5A-5E, collectively referred to as FIG. 5, illustrate exemplary topology and I/O alternatives for a homogenous processing engine having 16 cells.
Figure 5B:
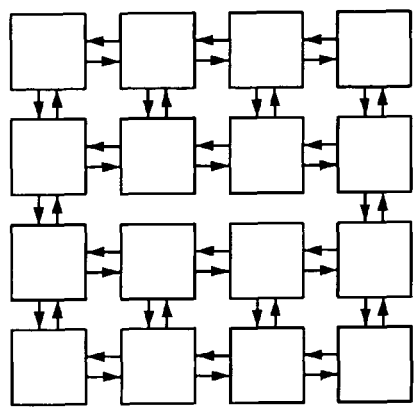
Figure 5A:
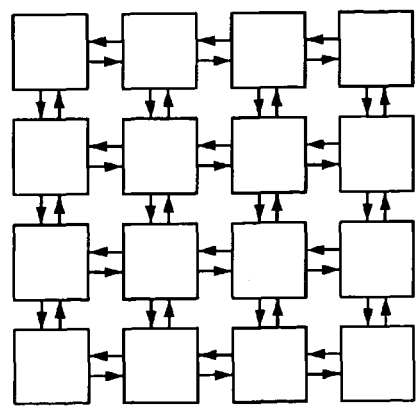
Figure 5E:
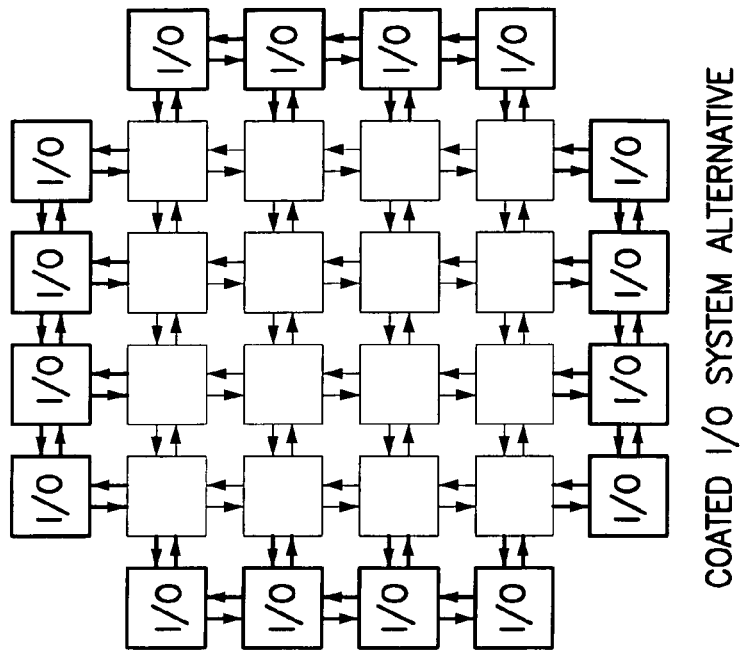
Figure 5D:
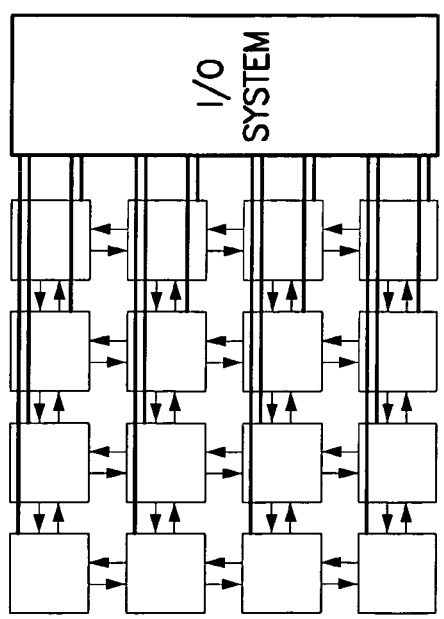

FIGS. 5A-5E illustrate five non-limiting examples of various topologies and I/O alternatives for the homogenous processing engine 10 having, for example 16 cells 12. More specifically, FIG. 5A shows a case of a full mesh of cells 12 (degree 4); FIG. 5B shows a limited connectivity alternative, where the degree of the cells 12 is limited to 3; FIG. 5C shows the case of the fully connected torus topology; FIG. 5D shows the full mesh of cells topology, as in FIG. 5A as a non-limiting example, where each cell 12 is coupled to the I/O system 14 via dedicated I/O links; and FIG. 5E shows a "coated" I/O system embodiment where the full mesh of cells topology of FIG. 5A (as a non-limiting embodiment), is configured so that only those cells 12 along the mesh border are interconnected to the I/O system 14.

Figures 2, 2A:
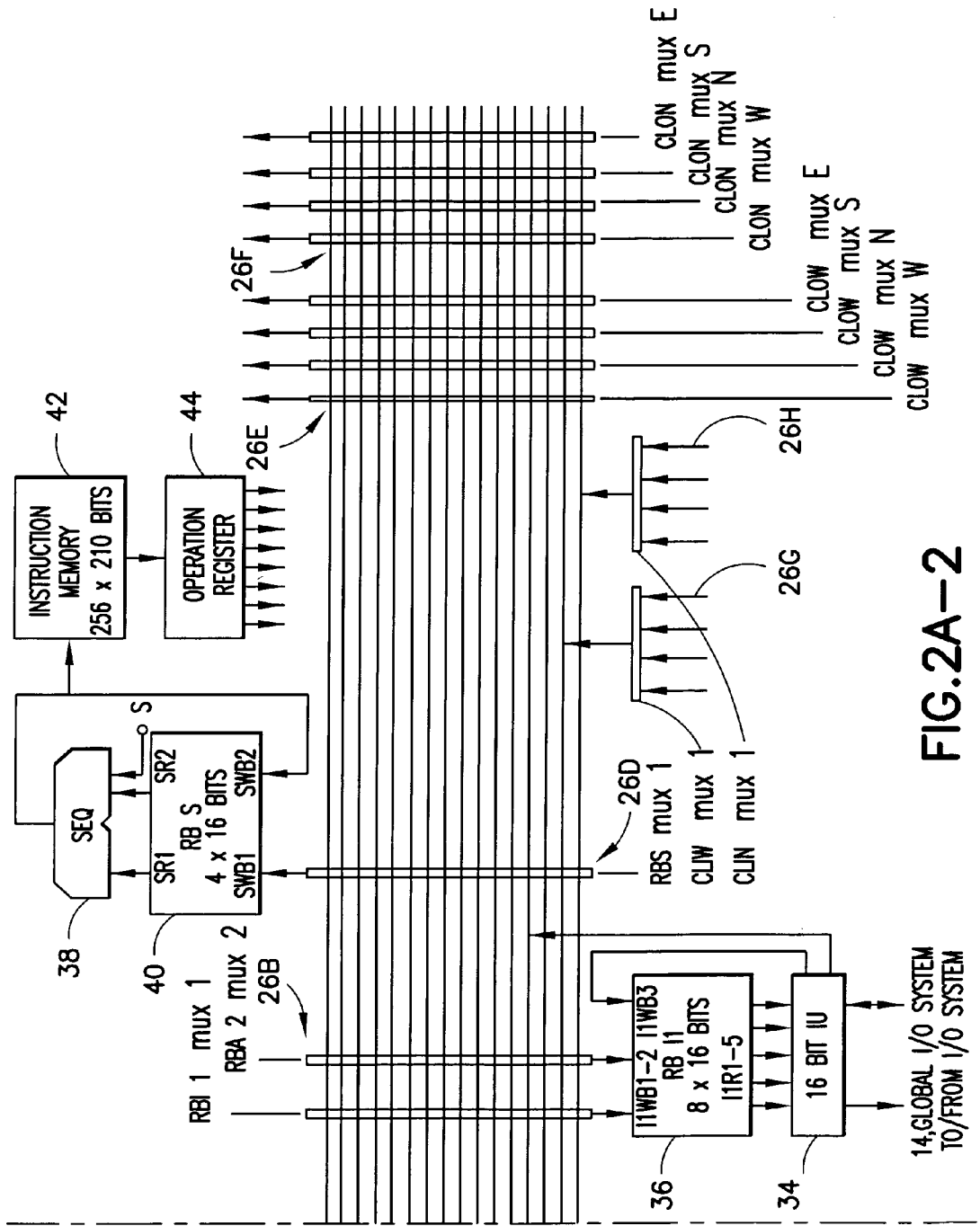
FIGS. 2A and 2B, collectively referred to as FIG. 2, each show an architecture embodiment of one of the cells of FIG. 1.

Referring to FIG. 2A, a given cell 12 includes computing and storage resources, such as 16/32-bit resources. More specifically, the cell 12 includes a plurality of 32×32 bit RBs 20 and corresponding 16/32 bit ALUs 22. The RBs 20 are coupled to an internal bus 24 via multiplexers 26A. Note that the RBs 32, 36 and 40 are also each connected to the bus 24 via associated multiplexers 26B, 26C and 26D, respectively.

The cell 12 also includes a 512×16 bit local memory 28, a 16-bit MU 30 and associated RB 32. The MU 30 provides an ability to store look up table (LUT) and intermediate results data. A 16-bit IU 34 provides connectivity to the global I/O system 14, shown in FIG. 1, and has an associated RB 36. The operation of the IU 34 can be divided into blocking and non-blocking instructions, where non-blocking instructions access I/O data without wait states, while blocking instructions freeze a region of cells 12 until data (for input) is available, or a register (for output) is free. Overall cell control is provided by a sequencer 38 having the associated RB 40. The sequencer 38 provides an input to an instruction memory 42 that outputs instructions to an operation register 44 having a number of outputs for controlling the various circuits to execute program instructions. The fact that each cell 12 includes the instruction sequencer 38 (or some equivalent functionality) enables each cell 12 to independently function as a processor core. The sequencer 38 includes a program counter, and is capable of executing conditional branch, jump and trap (e.g., take an exception and generate an interrupt) instructions Generally stated, each cell 12 includes A 16/32-bit ALUs 22 coupled with A communication units, M 16-bit memory units, Dn 16-bit "narrow" and Dw 32-bit "wide" intercommunication links, connectivity to four directions and I 16-bit I/O units, A+M+I+1 register blocks, Ni words of instruction memory, Nd words of local memory, and the sequencer unit 38. As a non-limiting example, A=4, M=1, Dn=1, Dw=1, I=1, Ni=256 and Nd=512. The plurality of multiplexers 26 (which may each function in a manner analogous to a cross-bar switch) enable the provision of a combined interconnection and forwarding network. Each cell 12 is one component part of the larger processing engine 10.

The instruction set includes standard arithmetic, logical, memory referencing, I/O, and sequencing sub-instructions, as well as certain RF signal processing specific extensions such as multiply-accumulate instructions, CORDIC instructions, shift-mask instructions, shift-round-mask instructions, saturation instructions and multiplex instructions. Memory referencing and I/O sub-instructions may feature complex addressing modes.

As non-limiting examples of ALU 22-specific instructions, there is an ADD instruction where Ra is added to Rb, and the result is placed in Ro, and an ADDI instruction that adds Ra to immediate Ia, and places the result in Ro. In addition, there are subtract, and multiply arithmetic instructions, as well as a complement of logical operation instructions including AND, OR and XOR, as well as various shift instructions. Certain CORDIC-specific instructions are also implemented. All instructions preferably execute in one clock cycle.

As was noted, each cell 12 preferably includes a number of the multiport register blocks (RBs 20, 32, 36, 40). In general each RB is dedicated to some functional unit. At least those types of RBs shown in FIG. 4 may be found in each cell 12. The specific numbers of RBs are based on an assumption that all instruction execute in a single clock cycle. If that is not the case, an implementation-specific analysis may be performed to avoid resource conflicts.

The number of cells 12 that are in use may be determined by evaluating the raw computational requirements of the application functionality, performing a mapping of functions onto cells, and adding suitable overhead for future functionality and quantization effects.

Still referring as well to FIG. 1, connectivity between cells 12 is implemented via Dn×16-bit and Dw×32-bit configurable interconnect links for each of the four directions (shown in FIG. 2A as North (N), South (S) East (E) and West (W) multiplexers 26E, 26F) utilizing the fully or limited connectivity mesh topology. The inter-cell links operate in accordance with the VLIW architecture to pass data to the neighboring cell(s), possibly controlled by the outgoing traffic multiplexers 26E, 26F. Incoming traffic arrives through multiplexers CLIW mux 1 26G and CLIN mux 1 26H. For a typical RF application one narrow and one wide communication link may provide sufficient intercommunication capacity.

Figure 2B:
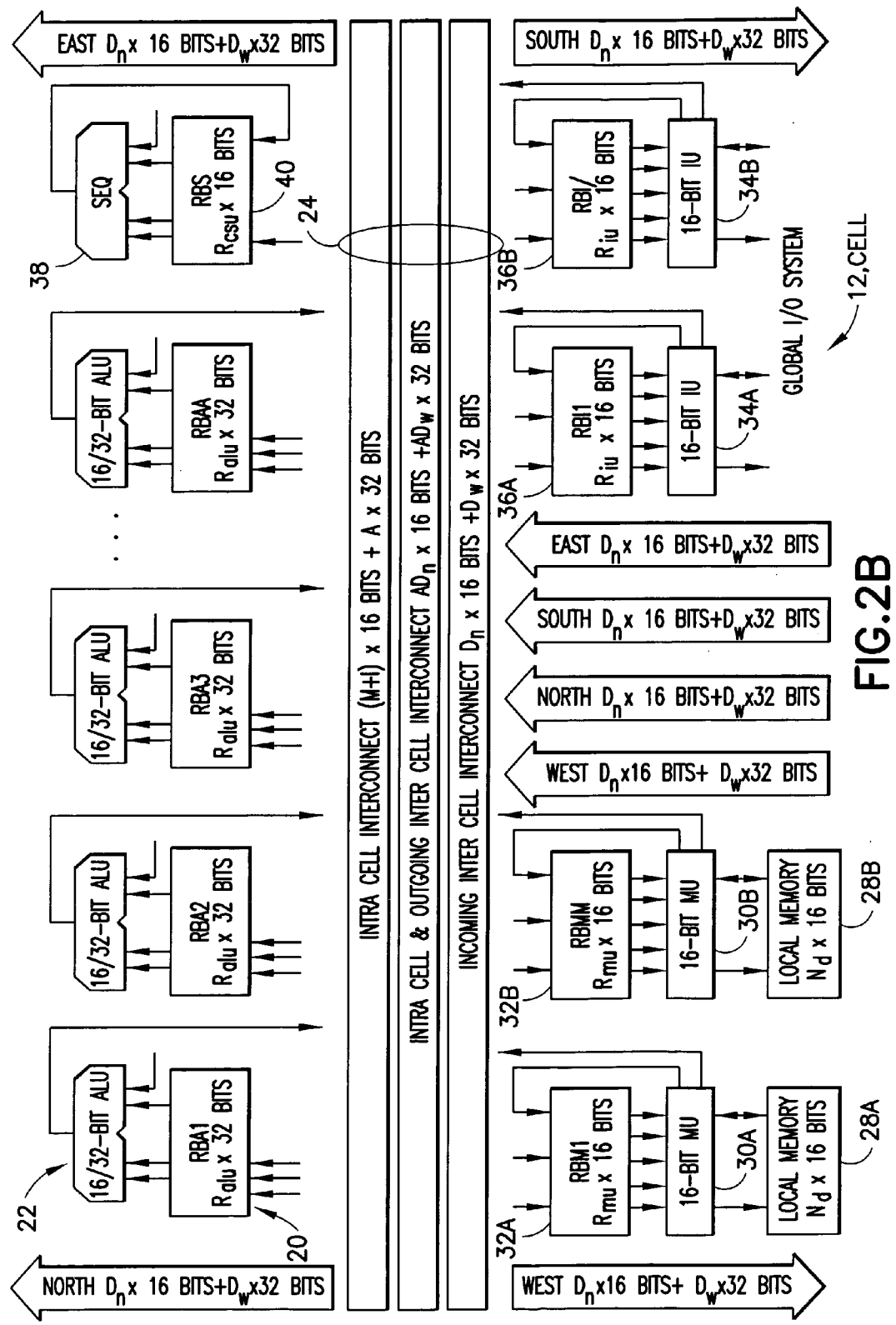

Reference can also be made to FIG. 2B for showing a block diagram of an exemplary embodiment of a cell 12 in the full connectivity mesh/torus engine 10 topology. Note in this exemplary embodiment there are multiple MUs 30, local memories 28 and IUs 34, and associated RBs 32 and 36. This block diagram also shows in a different format the intra-cell and inter-cell interconnects. Note that the incoming inter-cell interconnect selector (an entity formed by the incoming traffic multiplexers CLIW mux 1 26G and CLIN mux 1 26H in FIG. 2A) is an optional block, but may be advantageously used to reduce the size of the cell-level partial crossbar in the case of the fully connected topology.

Figure 3A:
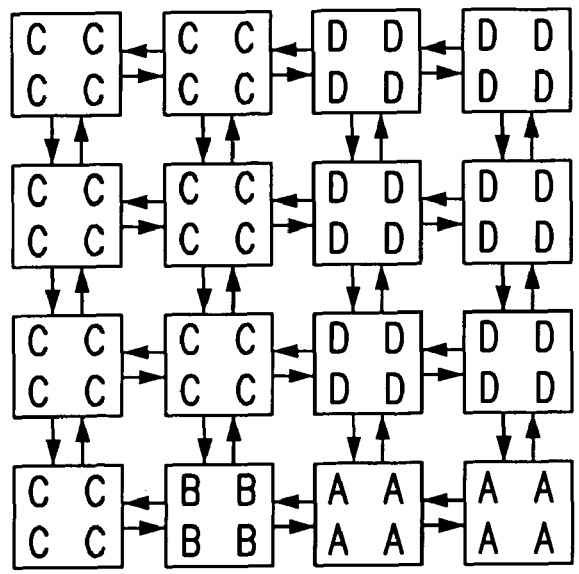
FIGS. 3A and 3B, collectively referred to as FIG. 3, show two exemplary embodiments of the plurality of cells partitioned into a plurality of regions.
Figure 3B:
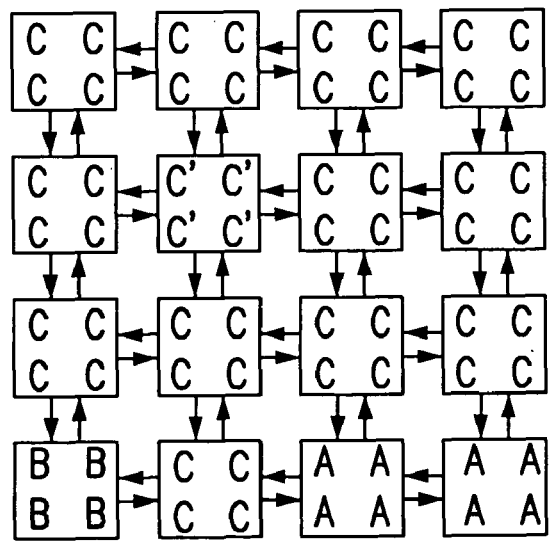

Referring also now to FIGS. 3A and 3B, a group or cluster of adjacent cells 12 form one or more synchronous regions, resembling a number of highly parallel VLIW machines or a configurable MIMD machine. This use of regions of cells 12 allow the same cell to be used for multiple functionalities in parallel, enabling the implementation of control domains that cannot be scheduled by dividing a single standard dependent master clock by an integer. Due to the construction of a region, it is also possible to place unique balanced control code (i.e., code in which all the alternative control paths have equal length) within a region (see FIG. 3B).

Note that each cell 12, and each region of cells 12, may be considered to be a sub-processor operating within the context of the overall processor engine 10.

In the non-limiting example of FIG. 3A the total of 16 cells 12 are partitioned into four regions A, B, C, D, where region A uses two of the cells 12, region B uses one cell 12, region C uses seven of the cells 12, while regions D uses 6 of the cells 12. In the non-limiting example of FIG. 3B the total of 16 cells 12 are partitioned into three regions A, B, C, where region A uses two of the cells 12, region B uses one cell 12 and region C uses the remaining 13 of the cells 12. Note that within region C there is a balanced control code cell 12 designated as C'.

The use of configurable regions of cells 12 is advantageous as the same engine 10 can be used for RF section 18-related receiver and transmitter functionality in parallel. In some type of RF systems there may be control domains that cannot be scheduled by dividing a single standard dependent master clock by an integer. In the exemplary embodiments of this invention functions are permitted to have balanced branches/execution paths with function-specific control within a region, so long as they comply with the region level control.

Figure 6:
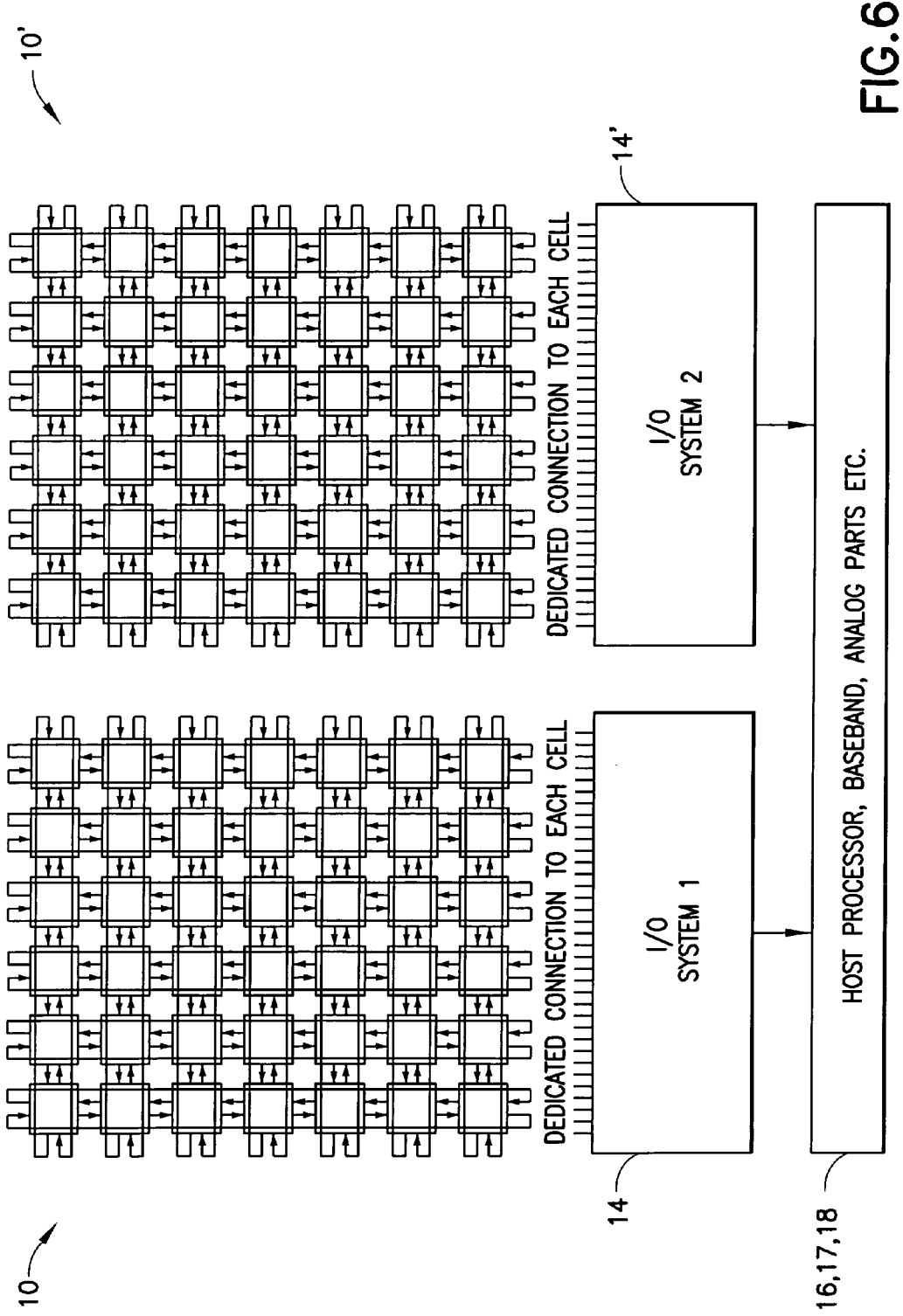
FIG. 6 shows an embodiment having more than one processing engine.

Note that more than one engine 10 may be employed in a given implementation. For example, FIG. 6 shows the use of two engines 10, 10', each having 42 of the cells 12, in conjunction with two I/O systems 14, 14' that provide connectivity to a host processor 17 as well as the baseband 16 and RF (analog) 18 sections. In the non-limiting example of FIG. 6 the engine-I/O system interface employs the dedicated connection to each cell 12, as in the example shown in FIG. 5D, and the 42 cells 12 of each engine 10, 10' are in the fully connected torus topology of FIG. 5C. In other embodiments (not shown) more than two engines 10 may be used, and each engine may have more or less than 42 of the cells 12.

Figure 7:
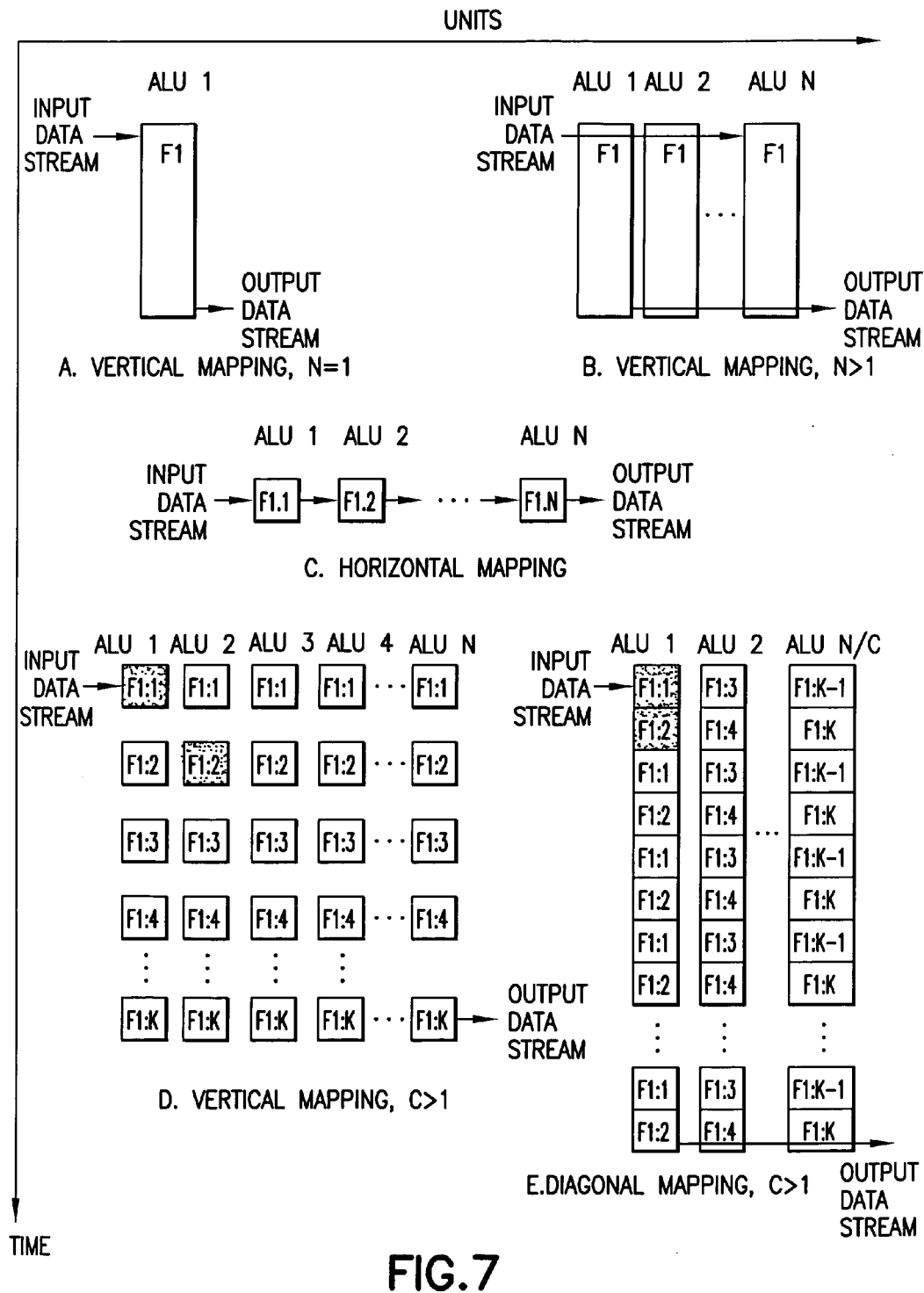
FIG. 7 shows vertical, horizontal and diagonal mapping approaches, where N=number of units, K=length of an iteration in instructions and C=an underutilization factor in horizontal mapping (e.g., due to a slow incoming data stream frequency).

Referring to FIG. 7, the engine 10 supports horizontal, vertical, and diagonal locality-aware mapping of functionality to convex regions of cells 12. These (non-limiting) terms are descriptive of the form and orientation of mapping alternatives in a two-dimensional space in which the origin is placed in the upper-left corner, the unit axis points horizontally rightwards, and the time axis points vertically downwards. In vertical mapping (FIG. 7A), each iteration of the functionality is executed in a single functional unit sequentially (or vertically with respect to the coordinate system) making it suitable for functions featuring independent iterations. If the computational requirements of the functionality cannot be satisfied with a single functional unit, a sufficient number of adjacent functional units can be allocated for executing independent iterations in an overlapped manner, as shown in FIG. 7B. In horizontal mapping (see FIG. 7C), iterations are partitioned among multiple adjacent units (horizontally with respect to the coordinate system) making it suitable for functions with dependent iterations. In diagonal mapping, multiple iterations are computed with a single ALU 22 to increase the utilization of ALUs (see FIG. 7E). This case is well suited for those situations in which vertical mapping suffers from underutilization (see FIG. 7D). The name diagonal arises from the fact that this mapping packs a (originally) diagonal computation pattern into a vertical one.

A region of contiguous cells 12 is setup by a process of mapping software to corresponding cells 12 and configuring exception mechanisms so that an incoming freezing signal freezes the entire region without affecting other regions. Inter-region communication occurs via the I/O system 14, assuming that communicating regions have a common border and do not run synchronously.

In general, individual regions are setup by loading a similar control code into individual cells 12 of the region and setting up certain configuration registers controlling the spreading of the freeze signal for all members of the group, with the exception described above. The freezing signal is spread over the region in a case where at least one of the cells 12 receives a freeze signal from the I/O system 14 when issuing a blocking I/O sub-instruction.

The balanced code (cell C' in FIG. 3B) permits having some unique control in a region so long as it does not break synchronization between the cells 12 belonging to the region. For example, consider a loop of eight instructions (i1, i2, i3, i4, i5, i6, i7, jump i1), and let this instruction loop be the same for all cells 12 that are members of a region. Now, it is possible to embed a unique balanced control for some cells having a branch (i4, i5 for the "else path" and i9, jump i6 for the "then path") in the middle of the loop (i1, i2, i3+branch to i9 if condition C is true, i4, i5, i6, i7,jump i1, i9,jump i6) as long as the synchronicity is retained among the cells of the region. Balancing herein means that both instruction paths are equally long, i.e., they are balanced.

Overall control of the engine 10 may be performed by the separate control or host processor 17, such as by performing operations of initializing the memories 28 (and possibly also 42), starting the engine 10, exchanging data via the I/O system 14, modifying the program and halting the engine 10.

An aspect of the exemplary embodiments of this invention is in mapping a given processing requirement onto the array of cells 12. As a non-limiting example, assume a case where the engine 10 is used in a communications device, such as one compatible with the GSM/EDGE system, or a WCDMA system, or a WiMAX (IEEE 802.16) system, or an E-UTRAN system, as four non-limiting examples. In each case there will be transmitter (Tx) and receiver (Rx) operations that need to be executed, possibly simultaneously and in parallel.

Figure 8:
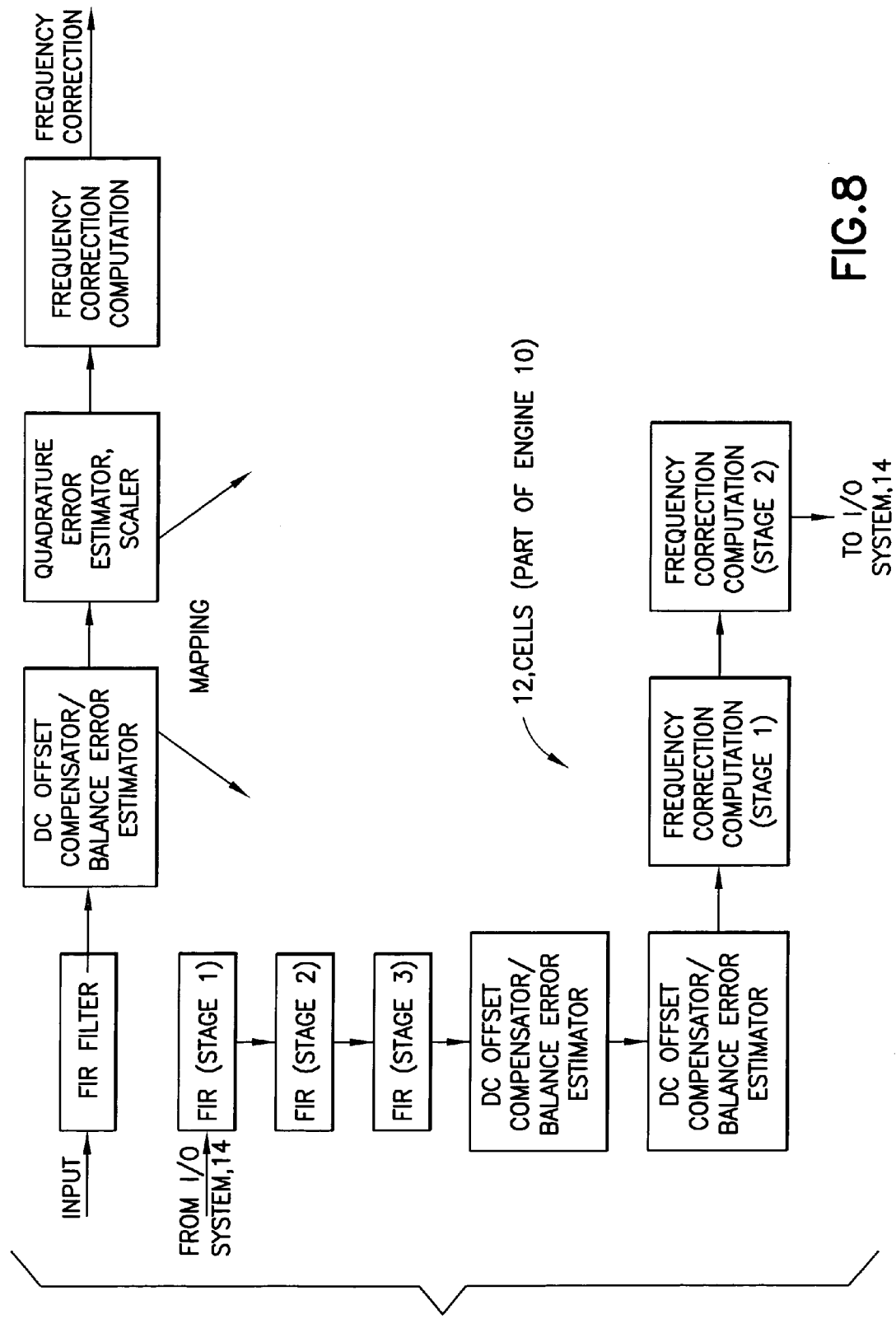
FIG. 8 shows an example of a mapping of a multi-stage receive function onto a plurality of cells of the engine embodiments shown in FIGS. 1, 3, 5 and 6.

As a non-limiting example, assume that a process to compute a frequency correction Rx function includes FIR filtering (three stages of computation), DC offset compensation/balance error estimation, quadrature error estimation and scaling, and the actual frequency correction computation (two stages of computation). In this case, and referring to FIG. 8, the total of seven stages of computation are mapped onto seven cells 12 of the engine 10, where sampled data from the receiver of the RF section 18 is input to the first cell 12 mapped to the first stage of the FIR computation, and where the final frequency correction value is output from the seventh cell that is mapped to the second stage of the frequency correction computation. These seven cells 12 would form one of the regions discussed above with respect to FIGS. 3A and 3B.

Note that simultaneously other cells 12 of the engine 10 can be mapped for executing other Rx and/or Tx functions including, as non-limiting examples, additional FIR filtering, amplitude calculations, scaling, gain control, CORDIC calculations, RF gain and sample rate conversions. The outputs of the engine 10 may be applied to the baseband section 16 for the Rx case, or fed back into the engine 10 for use in making additional calculations, or applied to the RF section 18 (possibly via a digital to analog converter for creating an analog signal) for the Tx case. Note that in some mapping cases it is possible that not all cells 12 of the engine 10 are utilized.

Note also that the engine 10 can be embodied in a multi-mode communication device 5, such as a cellular phone or more generally a user equipment (UE), that is operable with a plurality of standards (e.g., GSM/EDGE and WCDMA, or WCDMA and EUTRAN), or GSM/EDGE and WCDMA and WiMAX). In this case switching from mode to mode may be accomplished by the host processor 17 reprogramming the instruction memory 42 of different cells 12 in order to be compatible with the required mapping of the communication function types onto the engine 10. This can include changing the size and configurations of the different regions of the engine 10 accordingly. Operation under different communication standards and protocols will generally impose different operating frequency requirements on the engine 10.

Alternatively, one may employ the embodiment of FIG. 6 wherein (at least) one communication standard/protocol is mapped to one engine 10, and (at least) one other communication standard/protocol is mapped to another engine 10', thereby enabling simultaneous operation of two (or more) communication standards/protocols in a single multi-mode device 5.

In general, various one of the communication standards may operate in accordance with, as non-limiting examples, time division multiplex (TDM) techniques, code division multiplex (CDM) techniques, frequency division multiplex (FDM) techniques, orthogonal frequency division multiplex (OFDM) techniques, as well as single carrier, frequency division multiple access (SC-FDMA) and time division duplex (TDD) techniques, as well as combinations thereof. In these various cases the engine 10 is programmable to implement the desired functions between the baseband processor 16 and the RF section 18.

Note that in these various multi-mode (and multi-band) operational cases the RF section 18 may include the multiple transmitter and receiver circuits 52, 54, as well as multiple antenna structures 50. Further by example, for a MIMO reception case there may be a plurality of receiver circuits 54 having outputs that are processed in parallel by the engine 10.

Figure 10:
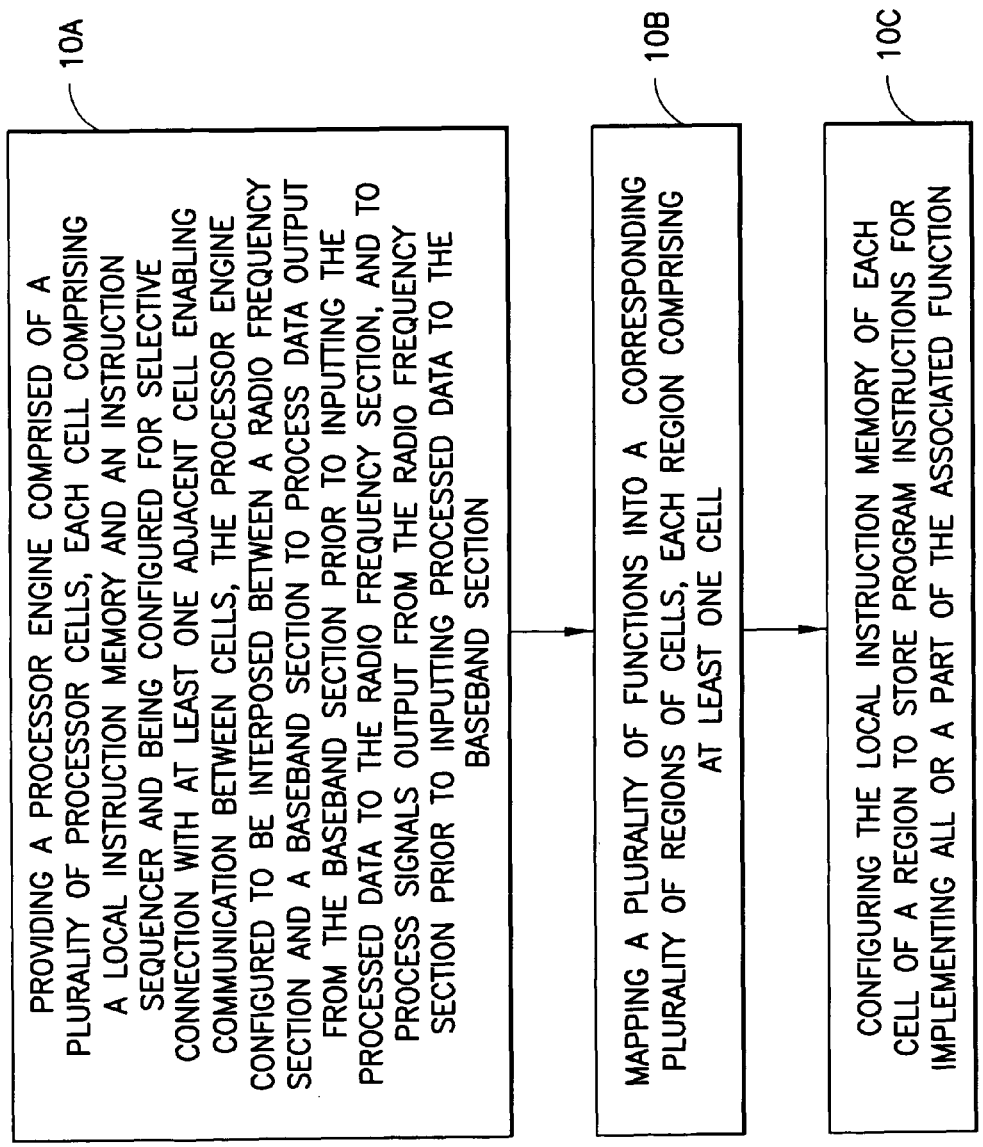
FIG. 10 is a logic flow diagram that is illustrative of a method in accordance with the exemplary embodiments of this invention.

Based on the foregoing description it can be appreciated that an aspect of the exemplary embodiments of this invention is a method, as shown in FIG. 10, that comprises (Block 10A): providing a processor engine comprised of a plurality of processor cells, each cell comprising a local instruction memory and an instruction sequencer and being configured for selective connection with at least one adjacent cell enabling communication between cells, the processor engine configured to be interposed between a radio frequency section and a baseband section to process data output from the baseband section prior to inputting the processed data to the radio frequency section, and to process signals output from the radio frequency section prior to inputting processed data to the baseband section; (Block 10B) mapping a plurality of functions into a corresponding plurality of regions of cells, each region comprising at least one cell; and (Block 10C) configuring the local instruction memory of each cell of a region to store program instructions for implementing all or a part of the associated function.

Various power saving techniques may be employed, such as clock gating, where those cells 12 that are not used (not mapped to for a particular communication standard) have their input clock signal gated off; power gating, where unused cells 12 have their input power turned off or reduced; clock and voltage scaling, where a region of cells that do not require high frequencies have their clock signal frequency and/or voltage levels reduced accordingly; and data blocking, where certain logic not needed by a current instruction (e.g., one or more ALUs 22) is switched off or its input power is reduced. Combinations of these approaches may be used as well.

In general, the various embodiments of the device 5 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The advantages that are realized by the use of the exemplary embodiments of this invention include, but are not limited to, enhanced performance scalability, high inter-cell communication bandwidth, good programmability with respect to typical application-specific heterogeneous parallel architectures, low overhead in RF signal processing algorithm execution, potentially high utilization of functional units, and low power consumption.

It should be appreciated that the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. As but some examples, the use of other similar or equivalent cell architectures may be attempted by those skilled in the art, as may the use of different numbers of cells than those specifically referred to above. However, all such and similar modifications of the teachings of this invention will still fall within the scope of this invention.

Further, while the exemplary embodiments have been described above in the context of certain wireless communication systems and standards, it should be appreciated that the exemplary embodiments of this invention are not limited for use with only these specific systems and standards, and that they may be used to advantage in other wireless communication systems.

Further, it should be appreciated that the engine 10, and possibly also the I/O system 14, may be combined with the baseband processor circuitry 16 within a single integrated circuit package or module, or the engine 10, and possibly also the I/O system 14, may be combined with the RF system circuitry 18 within a single integrated circuit package or module, or further still the engine 10, I/O system 14, baseband processor circuitry 16 and the RF system 18 may all be integrated together within a single integrated circuit package or module.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A data processor, comprising:
a processor engine comprised of a plurality of processor cells, each cell comprising a local instruction memory and an instruction sequencer and being configured for selective connection with at least one adjacent cell enabling communication between cells, said processor engine configured to be interposed between a radio frequency section and a baseband section to process data output from the baseband section prior to inputting the processed data to the radio frequency section, and to process signals output from the radio frequency section prior to inputting processed data to the baseband section, wherein a plurality of functions are mapped into a corresponding plurality of regions of cells, each region comprising at least one cell, and where the local instruction memory of each cell of a region is configured to store program instructions to implement all or a part of the associated function, and where a cell within a region of cells comprises balanced code enabling unique control in the region of cells that does not break synchronization between the cells belonging to the region.

2. The data processor as in claim 1, where one function is a coordinate rotation digital calculation function.

3. The data processor as in claim 1, where one function is a finite impulse response filter function.

4. The data processor as in claim 1, where the plurality of functions correspond to functions for implementing a particular radio frequency standard.

5. The data processor as in claim 1, where the plurality of functions correspond to functions to simultaneously implement a plurality of radio frequency standards.

6. The data processor as in claim 1, where the radio frequency section comprises at least one radio frequency transmitter and at least one radio frequency receiver.

7. The data processor as in claim 1, where the radio frequency section comprises a plurality of radio frequency transmitter and receivers.

8. The data processor as in claim 1, where the plurality of cells are selectively configured into a full mesh topology.

9. The data processor as in claim 1, where the plurality of cells are selectively configured into a full torus topology.

10. The data processor as in claim 1, where each instruction executes in one clock cycle.

11. The data processor as in claim 1, where each cell comprises an intra-cell bus and, coupled to the intra-cell bus, a plurality of arithmetic/logical units each coupled to the intra-cell bus via an associated register block.

12. The data processor as in claim 1, where each cell comprises an input/output unit configured to interface to a global input/output system through which the data processor is interfaced to the radio frequency section and to the baseband section.

13. The data processor as in claim 1, embodied in an integrated circuit.

14. The data processor as in claim 1, embodied in a communication device.

15. The data processor as in claim 1, embodied in a multimode, multi-frequency band communication device.

16. A method, comprising:
providing a processor engine comprised of a plurality of processor cells, each cell comprising a local instruction memory and an instruction sequencer and being configured for selective connection with at least one adjacent cell enabling communication between cells, said processor engine configured to be interposed between a radio frequency section and a baseband section to process data output from the baseband section prior to inputting the processed data to the radio frequency section, and to process signals output from the radio frequency section prior to inputting processed data to the baseband section;
mapping a plurality of functions into a corresponding plurality of regions of cells, each region comprising at least one cell; and
configuring the local instruction memory of each cell of a region to store program instructions for implementing all or a part of the associated function,
where configuring the local instruction memory of a cell within a region of cells comprises providing balanced code enabling unique control in the region of cells that does not break synchronization between the cells belonging to the region.

17. The method of claim 16, where one function is a coordinate rotation digital calculation function.

18. The method of claim 16, where one function is a finite impulse response filter function.

19. The method of claim 16, where the plurality of functions correspond to functions for implementing a particular radio frequency standard.

20. The method of claim 16, where the plurality of functions correspond to functions for simultaneously implementing a plurality of radio frequency standards.

21. The method of claim 16, where the plurality of cells are selectively configured into a full mesh topology.

22. The method of claim 16, where the plurality of cells are selectively configured into a full torus topology.

23. An apparatus comprising a radio frequency section, a baseband section and, interposed between said radio frequency section and said baseband section, a processor engine comprised of a plurality of processor cells, each cell comprising a local instruction memory and an instruction sequencer and being configured to selectively connect with at least one adjacent cell enabling communication between cells, said processor engine configured to process data output from the baseband section prior to inputting the processed data to the radio frequency section, and to process signals output from the radio frequency section prior to inputting processed data to the baseband section, where a cell within a region of cells comprises balanced code enabling unique control in the region of cells that does not break synchronization between the cells belonging to the region.

24. The apparatus of claim 23, where a plurality of functions are mapped into a corresponding plurality of regions of cells, each region comprising at least one cell, and where the local instruction memory of each cell of a region is configured to store program instructions to implement all or a part of the associated function.

25. The apparatus of claim 24, where one function is a coordinate rotation digital calculation function, and where another function is a finite impulse response filter function.

26. The apparatus of claim 24, where the plurality of functions correspond to functions to implement at least one radio frequency standard.

27. The apparatus as in claim 26, where the radio frequency section comprises at least one radio frequency transmitter and at least one radio frequency receiver associated with the at least one radio frequency standard.

28. The apparatus as in claim 26, where the plurality of cells are selectively configured into one of a full mesh topology, a full torus topology, or a limited connectivity topology.

29. The apparatus as in claim 26, where each cell comprises an intra-cell bus and, coupled to the intra-cell bus, a plurality of arithmetic/logical units each coupled to the intra-cell bus via an associated register block.

30. The apparatus as in claim 26, where each cell comprises an input/output unit configured to interface to a global input/output system through which the processor engine is interfaced to the radio frequency section and to the baseband section.

31. The apparatus as in claim 23, where said processor engine is embodied in an integrated circuit.

32. The apparatus as in claim 23, embodied as a single-mode, single-band communication device.

33. The apparatus as in claim 23, embodied as a multi-mode, multi-band communication device.

34. An integrated circuit, comprising:
a multiple instruction stream, multiple data stream processor engine comprised of a plurality of identical cells, each cell comprising a local instruction memory and an instruction sequencer and being configured to connect with at least one adjacent cell to provide communication between cells, said processor engine configured to be interposed between radio frequency circuitry and baseband circuitry of a wireless communication apparatus and to process at least one of data output from the baseband circuitry prior to input of the processed data to the radio frequency circuitry and signals output from the radio frequency circuitry prior to input of the processed data to the baseband circuitry, where the local instruction memory of each cell of a group of contiguous cells is configured to store program instructions to implement all or a part of a function, and where a cell within a group of contiguous cells comprises balanced code enabling unique control in the group of contiguous cells that does not break synchronization between the cells belonging to the group.

35. The integrated circuit of claim 34, where the function is comprised of one of a coordinate rotation digital calculation function and a finite impulse response filter function.

36. The integrated circuit of claim 34, where there are a plurality of groups of contiguous cells each programmed to execute all or part of an associated function of a set of functions that together implement at least one radio frequency wireless communication standard.

37. The integrated circuit of claim 36, where the radio frequency circuitry comprises a plurality of radio frequency transmitters and a plurality of radio frequency receivers individual ones of which are associated with one of a plurality of radio frequency wireless communication standards.

38. The integrated circuit of claim 34, where at least one of the radio frequency circuitry and the baseband circuitry comprises a part of the integrated circuit.

39. The integrated circuit as in claim 34, where each cell comprises an intra-cell bus and coupled to the intra-cell bus a plurality of arithmetic/logical units and cell input/output circuitry.

40. The integrated circuit as in claim 34, embodied as a part of a multi-mode, multi-frequency band wireless communication device.

41. The integrated circuit as in claim 34, where the plurality of cells are selectively configurable into a two dimensional array of cells having one of a mesh topology and a torus topology.

42. The integrated circuit as in claim 34, where said plurality of cells support horizontal, vertical and diagonal locality-aware mapping of functionality to convex groups of cells, where very long instruction word operation over a group of contiguous cells is achieved by providing identical control code for each cell of the group of contiguous cells and synchronously starting operation of the cells of the group of cells, and where an incoming freezing signal freezes an entire group of contiguous cells without affecting another group of cells.

* * * * *